(Model.)

L. WETMORE.
VEHICLE WHEEL.

No. 245,247. Patented Aug. 2, 1881.

Attest,
W. H. H. Knight
W. Blackstock

Inventor,
Loren Wetmore
By Hill & Church
his attys.

United States Patent Office.

LOREN WETMORE, OF MALONE, PENNSYLVANIA.

VEHICLE-WHEEL.

SPECIFICATION forming part of Letters Patent No. 245,247, dated August 2, 1881.

Application filed October 22, 1880. (Model.)

*To all whom it may concern:*

Be it known that I, LOREN WETMORE, of Malone, in the county of Tioga and State of Pennsylvania, have invented certain new and useful Improvements in Vehicle-Wheels; and I do hereby declare the following to be a full and exact description of the same, reference being had to the accompanying drawings, forming part of this specification, in which—

Figure 1:
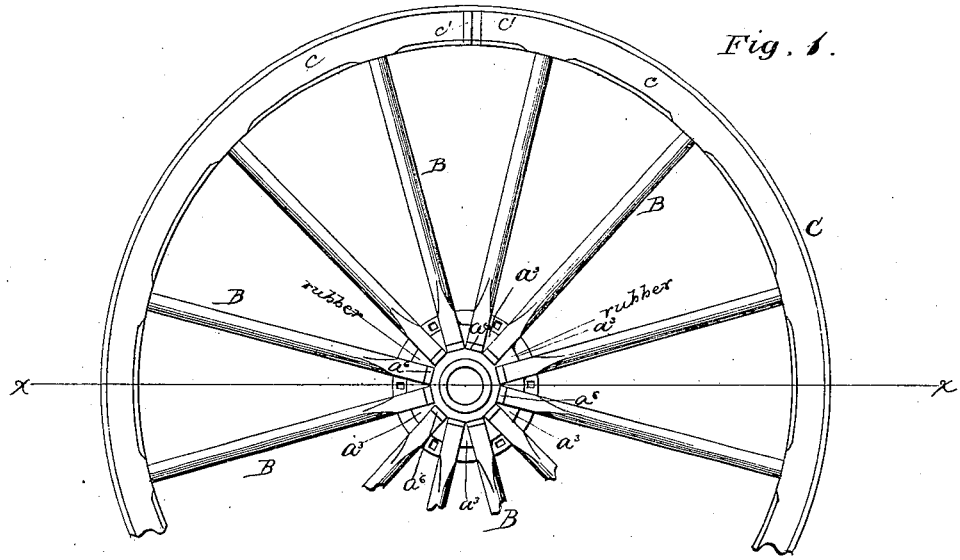
Figure 2:
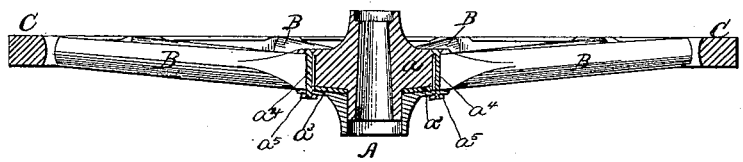
Figure 3:
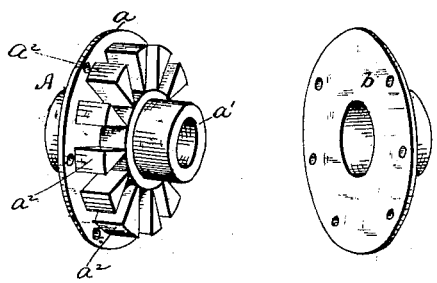
Figure 5:
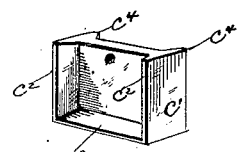
Figure 4:
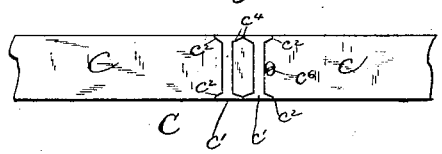

Figure 1 is a side view of the wheel with the inner cap-plate of the hub removed. Fig. 2 is a sectional view taken on the line $x\,x$, Fig. 1. Fig. 3 is a perspective view, showing the parts of the hub detached. Fig. 4 is a detail view of the means for adjusting the felly, and Fig. 5 a perspective view of one of the felly-blocks detached.

Similar letters of reference in the several figures denote the same parts.

My invention has for its object to provide a strong, light, and inexpensive vehicle-wheel; and it consists, first, in improved means for tightening the spokes in the hub to prevent them from rattling; and, secondly, in improved means for jointing the ends of the felly, all which I will now proceed to describe.

In the drawings, A represents the hub, B the spokes, C the felly, and D the tire.

The hub is composed of two main parts or castings, one of which consists of a cap or plate, $a$, which forms the outer part of the hub, a tubular extension or box, $a'$, for the accommodation of the axle, and an enlargement provided with radial slots or sockets for the reception of the inner ends or heads of the spokes. The segments $a^2$, which intervene between the said radial spoke-slots, are preferably not quite as long on their ends as the width of the spokes, and segments of india-rubber, $a^3$, about one-quarter of an inch thick, are placed upon the side of said segments $a^2$, so as to project out beyond and fill the spaces between the spokes.

The inner part or casting of the hub consists of a cap or plate, $b$, which fits over the tubular extension or box $a'$, and is secured to the outer plate, $a$, by means of bolts and nuts $a^4\,a^5$ or their equivalents. The tightening of the nuts $a^4$ brings the inner face of the plate $b$ up against the spokes and completes the sockets for the latter, while at the same time the rubber segments $a^3$ are expanded laterally against the spokes and effectually prevent them from rattling. By this arrangement the spokes may always be kept tight in their sockets, as any shrinkage of them can be compensated for by a further tightening of the nuts with a wrench.

When from any cause the tire becomes loose the inner plate, $b$, is removed and wedges $a^6$ are driven in between the bottoms of the sockets and the ends of the spokes, so as to force the spokes out radially and expand the felly and cause it to fit the tire more closely. The expansion of the felly, however, is apt to cause its ends to separate and render it liable to become displaced, and to provide against this I make it in two parts, $c\,c$, and on each end of each part fit a metal block, $c'$. This block has two flanges, $c^2\,c^2$, which embrace the sides of the felly, a flange, $c^3$, which fits over the top or outside of the same, and two other flanges, $c^4\,c^4$, opposite the flanges $c^2\,c^2$. A wedge, $c^5$, is inserted between the flanges $c^4\,c^4$ of the proximate metal blocks and held therein in any suitable manner, though preferably by a screw, $c^6$, working through one of the blocks, as shown. When by the expansion of the felly, as aforesaid, the blocks are caused to separate the wedge is removed and a thicker one driven in in its stead and held by the screw, as before. In this way perfect joints are at all times preserved between the parts of the felly.

Having thus described my invention, what I claim as new is—

1. In a vehicle-wheel, the combination of the radially-slotted outer hub-casting, A, having the segments $a^2$ between its spoke-slots shorter on their ends than the width of the spokes, with the spokes B, the india-rubber V-shaped segments $a^3$, placed upon the sides of said segments $a^2$ so as to project out beyond and fill the spaces between the spokes, and with the inner cap, $b$, of the hub, adapted, when forced up by tightening the nuts $a^4$, to bear directly against the faces of the spokes, and at the same time to laterally expand the rubber segments against the spokes to prevent the latter from rattling, substantially as described.

2. The combination, with the felly, of the metal blocks $c'$, having two flanges, $c^2 c^2$, which embrace the sides of the felly, a flange, $c^3$, which fits over the top or outside of the same, and two other flanges, $c^4 c^4$, opposite to the flanges $c^2 c^2$, and the wedge $c^5$, held between the flanges $c^4 c^4$ by the screw $c^6$, substantially as described.

LOREN WETMORE.

Witnesses:
J. B. NILES,
H. M. FOOTE.